(12) United States Patent
Onoue et al.

(10) Patent No.: US 11,514,248 B2
(45) Date of Patent: Nov. 29, 2022

(54) NON-TRANSITORY COMPUTER READABLE RECORDING MEDIUM, SEMANTIC VECTOR GENERATION METHOD, AND SEMANTIC VECTOR GENERATION DEVICE

(71) Applicant: FUJITSU LIMITED, Kawasaki (JP)

(72) Inventors: Satoshi Onoue, Yokohama (JP); Masahiro Kataoka, Kamura (JP)

(73) Assignee: FUJITSU LIMITED, Kawasaki (JP)

( * ) Notice: Subject to any disclaimer, the term of this patent is extended or adjusted under 35 U.S.C. 154(b) by 305 days.

(21) Appl. No.: 16/724,303

(22) Filed: Dec. 22, 2019

(65) Prior Publication Data

US 2020/0125804 A1   Apr. 23, 2020

Related U.S. Application Data

(63) Continuation of application No. PCT/JP2018/010878, filed on Mar. 19, 2018.

(30) Foreign Application Priority Data

Jun. 30, 2017   (JP) .............................. JP2017-129261

(51) Int. Cl.
*G06F 17/00* (2019.01)
*G06F 40/30* (2020.01)
(Continued)

(52) U.S. Cl.
CPC ............ *G06F 40/30* (2020.01); *G06F 40/237* (2020.01); *G06F 40/247* (2020.01)

(58) Field of Classification Search
None
See application file for complete search history.

(56) References Cited

U.S. PATENT DOCUMENTS 9,008,390 B2\* 4/2015 Takata ................... G16Z 99/00
                                                        382/128
2003/0177000 A1\* 9/2003 Mao ....................... G06F 40/216
                                                        707/E17.058
(Continued)

FOREIGN PATENT DOCUMENTS

JP   2006-171912 A   6/2006
JP   2010-152561 A   7/2010
JP   2013-020431 A   1/2013

OTHER PUBLICATIONS

Ouchi, K., et al., "Construction of Distributed Representation of Word Meanings from Distributed Representation of Words Using Synonyms," Proceedings of the 22nd Annual Meeting of the Natural Language Processing Society, Feb. 29, 2016, pp. 99-102.
(Continued)

*Primary Examiner* — Satwant K Singh
(74) *Attorney, Agent, or Firm* — Xsensus LLP

(57) ABSTRACT

A semantic vector generation device (100) obtains vectors of a plurality of words included in text data. The semantic vector generation device (100) extracts a word included in any group. The semantic vector generation device (100) generates a vector in accordance with the any group on the basis of a vector of the word extracted among the obtained vectors of the words. The semantic vector generation device (100) identifies a vector of a word included in an explanation of any semantics of the word extracted among the obtained vectors of the words. The semantic vector generation device (100) generates a vector in accordance with the any semantics on the basis of the vector identified and the vector generated.

9 Claims, 14 Drawing Sheets

(51) Int. Cl.
*G06F 40/247* (2020.01)
*G06F 40/237* (2020.01)

(56) References Cited

U.S. PATENT DOCUMENTS

| | | | | |
|---|---|---|---|---|
| 2007/0136067 | A1* | 6/2007 | Scholl | G10L 15/26 |
| | | | | 704/270 |
| 2016/0371254 | A1* | 12/2016 | Yamagami | G06N 3/0472 |
| 2017/0308523 | A1* | 10/2017 | Wang | G06F 40/232 |
| 2018/0075017 | A1* | 3/2018 | Takase | G06F 16/3344 |
| 2018/0267961 | A1* | 9/2018 | Yamagami | G06F 40/247 |

OTHER PUBLICATIONS

International Search Report and Written Opinion dated Jun. 19, 2018 for PCT/JP2018/010878 filed on Mar. 19, 2018, 8 pages including English Translation of the International Search Report.
Neelakantan, A., et al. "Efficient Non-parametric Estimation of Multiple Embeddings per Word in Vector Space," Proceeding of the 2014 Conference on Empirical Methods In Natural Language Processing (EMNLP), Association for Computational Linguistics, Doha, Qatar, Oct. 25-29, 2014, pp. 1059-1069.

* cited by examiner

FIG.3

| SYNONYM IDENTIFICATION NUMBER | WORD (SYNONYM) |
|---|---|
| 1.1 | birth |
| 1.1 | genesis |
| 1.1 | nativity |
| 1.1 | childbirth |
| 1.1 | birthing |
| 1.1 | nascency |
| ... | ... |
| 234.1 | land |
| ... | ... |
| 234.1 | glebe |
| ... | ... |
| 920.17 | deep |
| 920.17 | wise |
| 920.17 | knowing |
| 920.17 | heavy |
| 920.17 | learned |
| 920.17 | profound |
| ... | ... |

| WORD | VECTOR |
|---|---|
| ... | ... |
| birth | $V_{birth}$ |
| genesis | $V_{genesis}$ |
| glebe | $V_{glebe}$ |
| land | $V_{land}$ |
| ... | ... |
| deep | $V_{deep}$ |
| wise | $V_{wise}$ |
| knowing | $V_{knowing}$ |
| ... | ... |

| WORD | SEMANTICS | DEFINITION NUMBER | DEFINITION | EXAMPLE SENTENCE |
|---|---|---|---|---|
| ... | ... | ... | ... | ... |
| deep | TOP TO BOTTOM | 1 | having a large distance from the top or surface to the bottom | a deep hole deep water |
| deep | | ... | ... | ... |
| | KNOWLEDGE | 12 | showing great knowledge or understanding | a deep understanding |
| deep | | ... | ... | ... |
| deep | IN SPORT | 16 | to or from a position far down or across the field | a deep ball from Brown |
| ... | ... | ... | ... | ... |

| SYNONYM IDENTIFICATION NUMBER | WORD (SYNONYM) | VECTOR | GROUP VECTOR OF SYNONYM IDENTIFICATION NUMBER |
|---|---|---|---|
| 1.1 | birth | $V_{birth}$ | $V_{1.1}$ |
| 1.1 | genesis | $V_{genesis}$ | |
| 1.1 | nativity | $V_{nativity}$ | |
| 1.1 | childbirth | $V_{childbirth}$ | |
| 1.1 | birthing | $V_{birthing}$ | |
| 1.1 | nascency | $V_{nascency}$ | |
| ... | ... | ... | ... |
| 234.1 | land | $V_{land}$ | $V_{234.1}$ |
| ... | ... | ... | |
| 234.1 | glebe | $V_{glebe}$ | |
| ... | ... | ... | ... |
| 920.17 | deep | $V_{deep}$ | $V_{920.17}$ |
| 920.17 | wise | $V_{wise}$ | |
| 920.17 | knowing | $V_{knowing}$ | |
| 920.17 | heavy | $V_{heavy}$ | |
| 920.17 | learned | $V_{learned}$ | |
| 920.17 | profound | $V_{profound}$ | |
| ... | ... | ... | ... |

FIG.7

| MULTI-SENSE WORD | NUM-BER OF SEMAN-TICS | SEMANTICS | SYNONYM IDENTIFI-CATION NUMBER | GROUP VECTOR | DEFINI-TION NUM-BER | SEMANTIC CODE | SEMANTIC VECTOR 150e |
|---|---|---|---|---|---|---|---|
| ... | ... | ... | ... | ... | ... | ... | ... |
| deep | 15 | TOP TO BOTTOM | 275.2 | $V_{275.2}$ | 1 | 10100h | $V_{deep\_TOP\ TO\ BOTTOM}$ |
| | | FRONT TO BACK | 269.6 | $V_{269.6}$ | 2 | 10101h | $V_{deep\_FRONT\ TO\ BACK}$ |
| | | MEASUREMENT | 54.11 | $V_{54.11}$ | 3 | 10102h | $V_{deep\_MEASUREMENT}$ |
| | | DEEP | 207.8 | $V_{207.8}$ | 4,5 | 10103h | $V_{deep\_DEEP}$ |
| | | BREATH/SIGH | 265.16 | $V_{265.16}$ | 6 | 10104h | $V_{deep\_BREATH/SIGH}$ |
| | | SOUNDS | 928.21 | $V_{928.21}$ | 7 | 10105h | $V_{deep\_SOUNDS}$ |
| | | COLOURS | 35.17 | $V_{35.17}$ | 8 | 10106h | $V_{deep\_COLOURS}$ |
| | | SLEEP | 221.3 | $V_{221.3}$ | 9 | 10107h | $V_{deep\_SLEEP}$ |
| | | SREIOUS | 247.6 | $V_{247.6}$ | 10 | 10108h | $V_{deep\_SREIOUS}$ |
| | | EMOTIONS | 93.24 | $V_{93.24}$ | 11 | 10109h | $V_{deep\_EMOTIONS}$ |
| | | KNOWLEDGE | 920.17 | $V_{920.17}$ | 12 | 10110h | $V_{deep\_KNOWLEDGE}$ |
| | | DIFFICULT TO UNDERSTAND | 235.10 | $V_{235.10}$ | 13 | 10111h | $V_{deep\_DIFFICULT\ TO\ UNDERSTAND}$ |
| | | INVOLVED | 415.12 | $V_{415.12}$ | 14 | 10112h | $V_{deep\_INVOLVED}$ |
| | | PERSON | 345.5 | $V_{345.5}$ | 15 | 10113h | $V_{deep\_PERSON}$ |
| | | IN SPORT | 158.11 | $V_{158.11}$ | 16 | 10114h | $V_{deep\_IN\ SPORT}$ |
| ... | | | | | | | |

FIG.8

| MULTISENSE WORD | SEMANTIC ID | SEMANTICS | CO-OCCURRING WORD (CO-OCCURRENCE RATE) | ... | CO-OCCURRING WORD (CO-OCCURRENCE RATE) |
|---|---|---|---|---|---|
| deep | (1) | top to bottom | | ... | |
| | (2) | front to back | | ... | |
| | (3) | measurement | | ... | |
| | (4) | -deep | | ... | |
| | ... | ... | ... | ... | ... |
| | (12) | knowledge | understanding (41%) | ... | idea (19%) |
| | ... | ... | | ... | |
| | (16) | in sport | | ... | |
| ... | ... | ... | | ... | |

150f

FIG.9
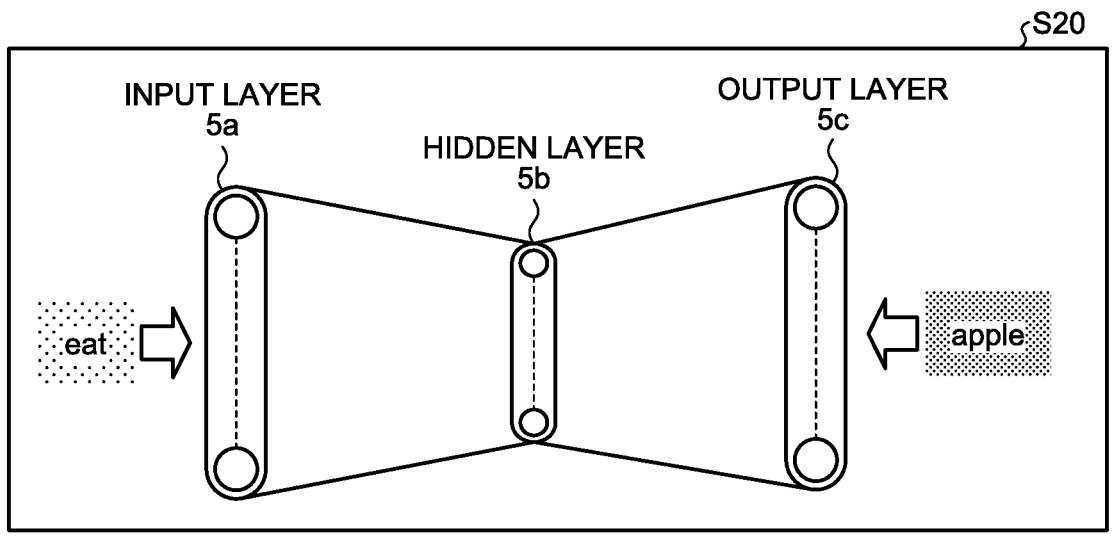
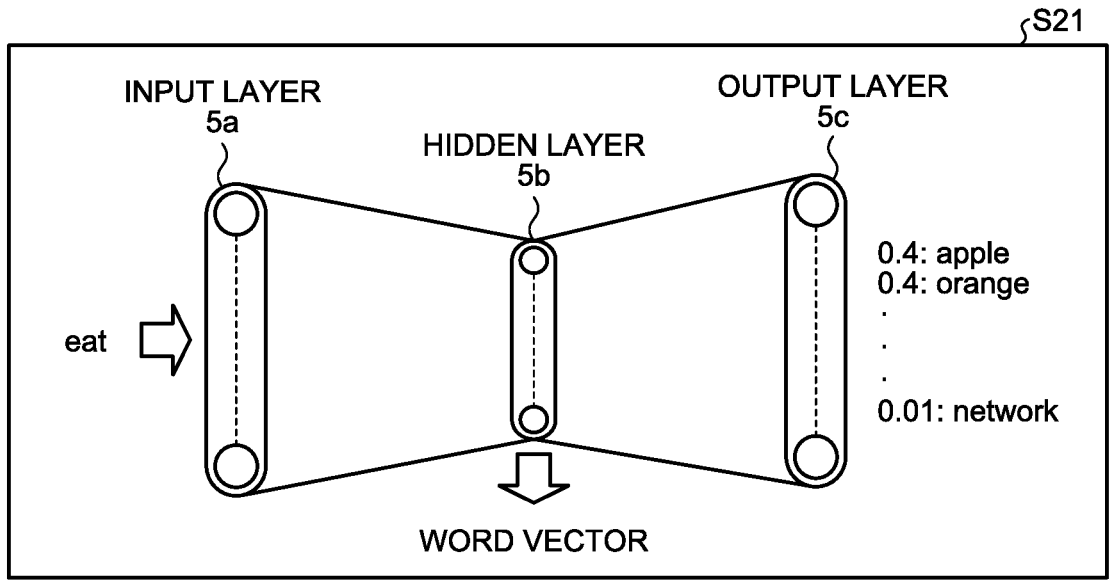

NON-TRANSITORY COMPUTER READABLE RECORDING MEDIUM, SEMANTIC VECTOR GENERATION METHOD, AND SEMANTIC VECTOR GENERATION DEVICE

CROSS-REFERENCE TO RELATED APPLICATION(S)

This application is a continuation of International Application No. PCT/JP2018/010878, filed on Mar. 19, 2018 which claims the benefit of priority of the prior Japanese Patent Application No. 2017-129261, filed on Jun. 30, 2017, the entire contents of which are incorporated herein by reference.

FIELD

The embodiment discussed herein is related to a computer-readable recording medium and the like.

BACKGROUND

In recent years, there have been conventional techniques of computing a vector of a word included in a sentence on the basis of Word2Vec (Skip-gram). A case where a vector of a word "mean" is computed is described below as an example. In the conventional techniques, on the basis of a Sentence 1, a Sentence 2, and other sentences (not illustrated), a feature amount of a hidden layer is computed in such a manner as to optimize the probability of a co-occurring word that occurs with the word "mean", and the computed feature amount is set as a vector of the word "mean".

"What does this phrase mean?" . . . (Sentence 1)
"I mean it as a joke." . . . (Sentence 2)

However, the conventional techniques described above have a problem with a multisense word with plural semantics in that a semantic vector corresponding to each of the semantics has low relevance to the semantics.

For example, in the conventional techniques, vector computation simply takes into account the co-occurrence relation between words, and does not distinguish plural semantics of a target multisense word in a text from each other. Thus, only a single vector is assigned to the target multisense word. For example, the word "mean" included in the Sentence 1 is a multisense word. When the semantics of this word is determined on the basis of the Sentence 1 in its entirety, the semantics of the word "mean" included in the Sentence 1 is "sense". In contrast, when the semantics of the word "mean" included in the Sentence 2 is determined on the basis of the Sentence 2 in its entirety, the semantics of the word "mean" included in the Sentence 2 is "say".

Therefore, the semantics of the word "mean" included in the Sentence 1 is different from the semantics of the word "mean" included in the Sentence 2. It can thus be said that when a vector is assigned to the word "mean" simply on the basis of the co-occurrence relation, only a vector with low relevance to the semantics of the word is computed.

SUMMARY

According to an aspect of an embodiment, a non-transitory computer readable storage medium has stored therein a program that causes a computer to execute a process including: obtaining vectors of a plurality of words included in text data; referring to a storage unit that stores therein a plurality of words satisfying a semantic similarity criterion in association with a group of the words; extracting a word included in any group; first generating a vector in accordance with the any group on a basis of a vector of the word extracted among obtained vectors of the words; referring to the storage unit that stores therein an explanation of each semantics of a word including plural semantics in association with the word; identifying a vector of a word included in an explanation of any semantics of the word extracted among the obtained vectors of the words; and second generating a vector in accordance with the any semantics on a basis of the identified vector and the generated vector.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of a data structure of a synonym dictionary table;

FIG. 4 is a diagram illustrating an example of a data structure of a word vector table;

FIG. 5 is a diagram illustrating an example of a data structure of an English/language dictionary table;

FIG. 6 is a diagram illustrating an example of a data structure of a synonym table;

FIG. 7 is a diagram illustrating an example of a data structure of a multisense word table;

FIG. 8 is a diagram illustrating an example of a data structure of a semantic determination table;

FIG. 9 is an explanatory diagram of an example of a process in a word-vector computation unit;

DESCRIPTION OF EMBODIMENT(S)

Preferred embodiments of the present invention will be explained with reference to accompanying drawings. The present invention is not limited to the embodiment.

Figure 1:
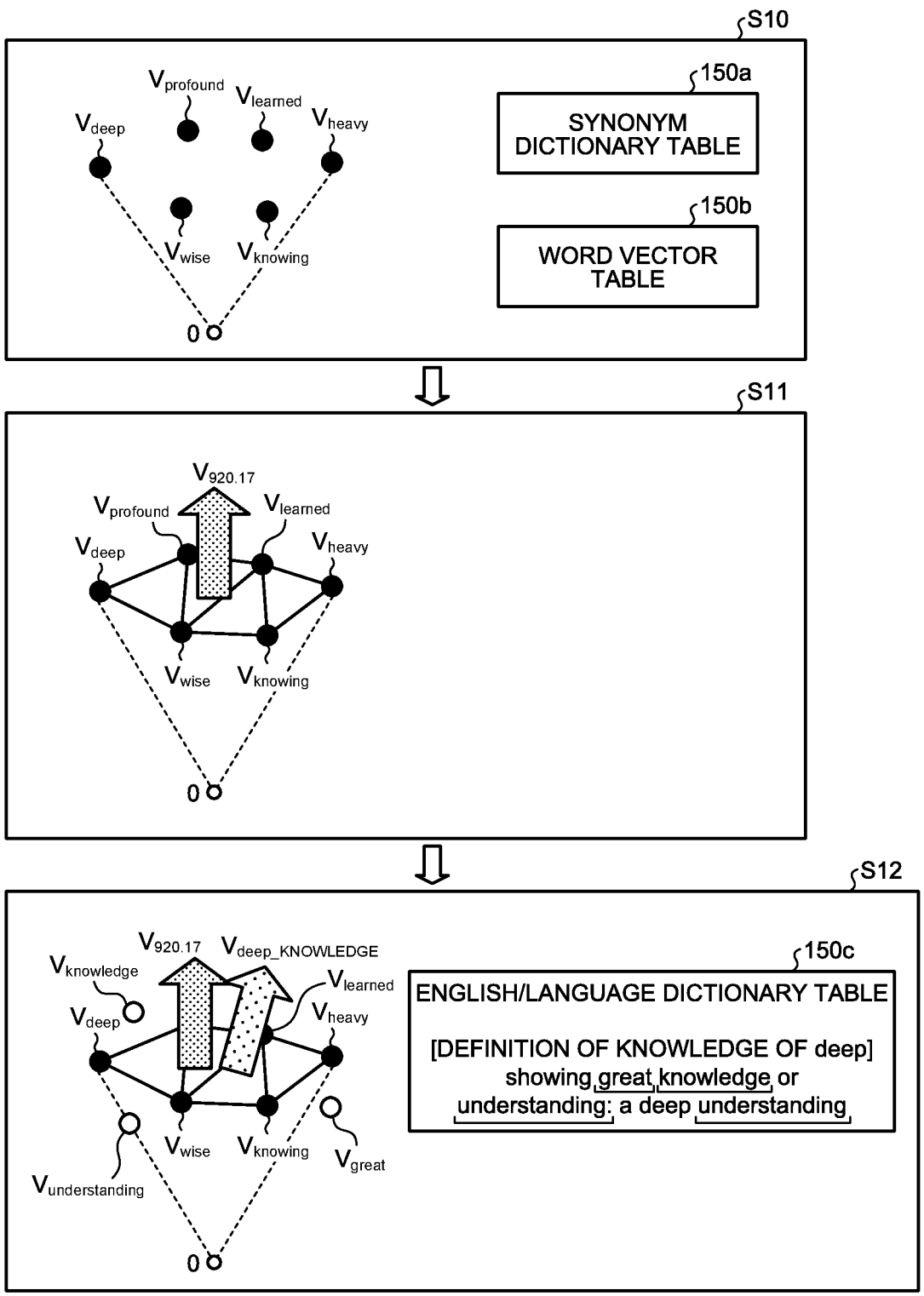
FIG. 1 is an explanatory diagram of an example of a process in a semantic vector generation device according to an embodiment of the present invention.

FIG. 1 is an explanatory diagram of an example of a process in a semantic vector generation device according to an embodiment of the present invention. For example, a case is described where the semantic vector generation device calculates a vector of a word "deep" included in text data 10. The word "deep" is a multisense word with plural semantics. For example, the word "deep" has semantics "top to bottom, front to back, measurement, deep, breath, sounds, colours, sleep, serious, emotions, knowledge, difficult to understand, involved, person, and in sport". FIG. 1 illustrates an example of a process of calculating a semantic vector of "knowledge" that is one of the semantics of the word "deep".

Step S10 in FIG. 1 is described. The semantic vector generation device compares the word "deep" with a synonym dictionary table 150a, and identifies synonyms for the word "deep". The synonym dictionary table 150a is a table that associates a word with corresponding synonyms. As an example, the synonyms for the word "deep" are set as "wise, knowing, heavy, learned, and profound".

The semantic vector generation device compares the word "deep" and each of the synonyms "wise, knowing, heavy, learned, and profound" with a word vector table 150b, and identifies vectors of the word and the synonyms. The word vector table 150b is a table that associates a word with vector of word. For example, the vector of the word "deep" is identified as "$V_{deep}$". The vector of the synonym "wise" is identified as "$V_{wise}$". The vector of the synonym "knowing" is identified as "$V_{knowing}$". The vector of the synonym "heavy" is identified as "$V_{heavy}$". The vector of the synonym "learned" is identified as "$V_{learned}$". The vector of the synonym "profound" is identified as "$V_{profound}$".

Step S11 in FIG. 1 is described. The semantic vector generation device divides the vectors "$V_{deep}$, $V_{wise}$, $V_{knowing}$, $V_{heavy}$, $V_{learned}$, and $V_{profound}$" into a plurality of meshes to calculate normal vectors of the respective meshes. The semantic vector generation device combines the normal vectors of the respective meshes to calculate a group vector $V_{920.17}$ of the vectors "$V_{deep}$, $V_{wise}$, $V_{knowing}$, $V_{heavy}$, $V_{learned}$, and $V_{profound}$".

Step S12 in FIG. 1 is described. The semantic vector generation device refers to an English/language dictionary table 150c, and extracts a feature word included in the definition of the semantics "knowledge" of the word "deep". The English/language dictionary table 150c is a table that holds therein information of the definition that defines each semantics of a word. For example, the semantic vector generation device extracts feature words "great, knowledge, and understanding" from this definition. Identical feature words are handled as one feature word.

The semantic vector generation device compares the feature words with the word vector table 150b, and identifies the vectors of the respective feature words. For example, the vector of the feature word "great" is identified as "$V_{great}$". The vector of the feature word "knowledge" is identified as "$V_{knowledge}$". The vector of the feature word "understanding" is identified as "$V_{understanding}$".

For example, the semantic vector generation device excludes some of the words included in the definition, which are identical to the synonyms as the source of generation of the group vector, from the feature words. The semantic vector generation device excludes an article and a conjunction from the words included in the definition. The semantic vector generation device excludes formal words such as "showing" from the words included in the definition.

On the basis of the vectors of the feature words, "$V_{great}$, $V_{knowledge}$, and $V_{understanding}$", the semantic vector generation device corrects the group vector $V_{920.17}$ to thereby generate a semantic vector of "knowledge" that is one of the semantics of the word "deep" as $V_{deep\_KNOWLEDGE}$. For example, a semantic vector generation unit combines the normal vectors of the vectors "$V_{great}$, $V_{knowledge}$, and $V_{understanding}$" with the group vector $V_{920.17}$ in order to generate the semantic vector $V_{deep\_KNOWLEDGE}$.

In this manner, the semantic vector generation device generates a semantic vector of a target word by correcting a group vector using the vectors of feature words included in the definition of a target semantics, the group vector being obtained by combing the vector of the target word with the vectors of synonyms for the target word. Accordingly, the semantic vector generation device can generate a semantic vector appropriate to each of the semantics of an identical word.

Figure 2:
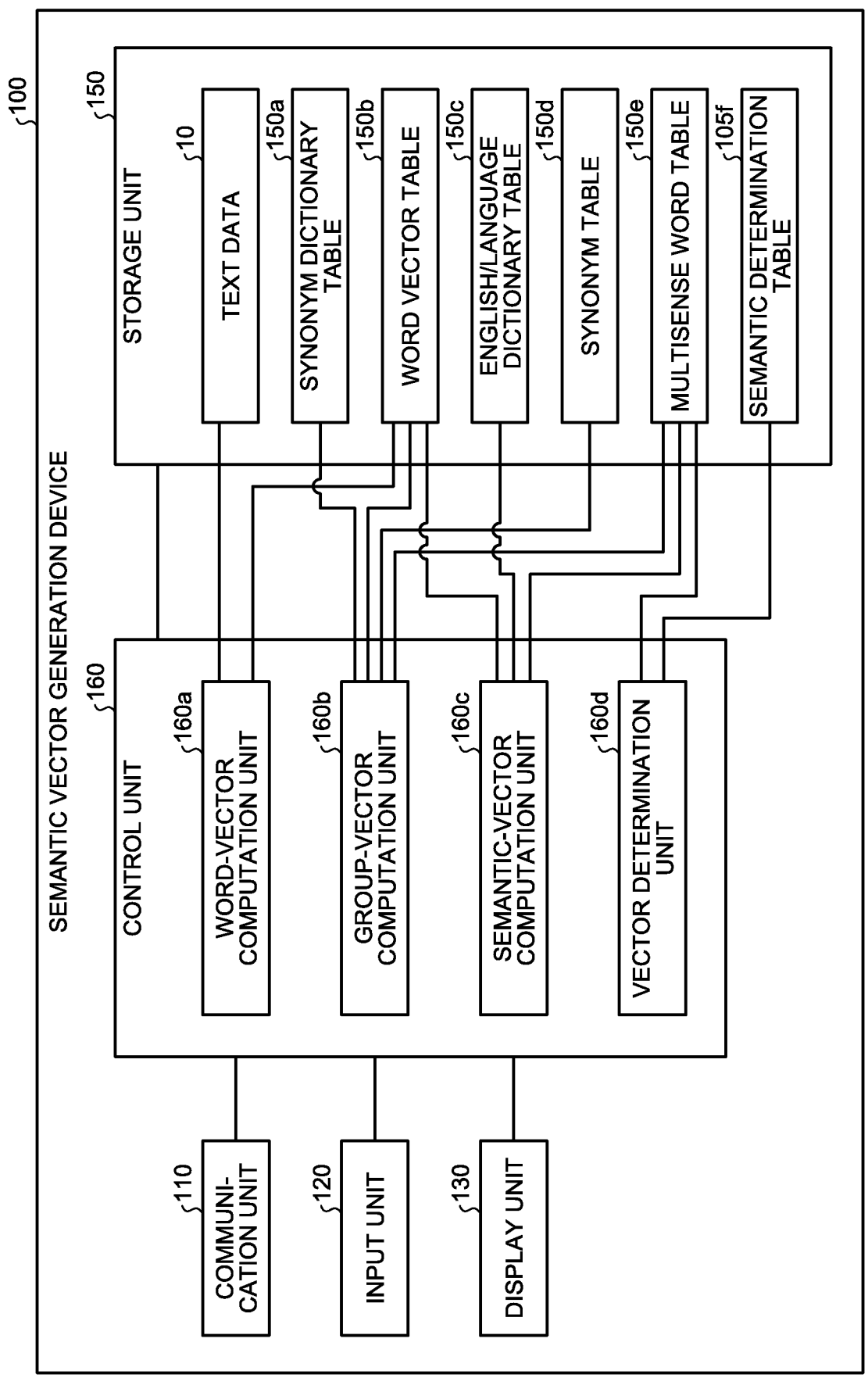
FIG. 2 is a functional block diagram illustrating a configuration of the semantic vector generation device according to the embodiment.

Next, a configuration of the semantic vector generation device according to the present embodiment is described. FIG. 2 is a functional block diagram illustrating the configuration of the semantic vector generation device according to the present embodiment. As illustrated in FIG. 2, a semantic vector generation device 100 includes a communication unit 110, an input unit 120, a display unit 130, a storage unit 150, and a control unit 160.

The communication unit 110 is a processing unit that performs data communication with an external device (not illustrated) through a network. For example, the communication unit 110 is equivalent to a communication device.

The input unit 120 is an input device through which various types of information are input to the semantic vector generation device 100. For example, the input unit 120 is equivalent to a keyboard, a mouse, a touch panel, or the like.

The display unit 130 is a display device that displays various types of information output from the control unit 160. For example, the display unit 130 is equivalent to a liquid crystal display, a touch panel, or the like.

The storage unit 150 includes the text data 10, the synonym dictionary table 150a, the word vector table 150b, the English/language dictionary table 150c, a synonym table 150d, a multisense word table 150e, and a semantic determination table 150f. The storage unit 150 is equivalent to a semiconductor memory device such as a RAM (Random Access Memory), a ROM (Read Only Memory), and a Flash Memory, or is equivalent to a storage device such as a HDD (Hard Disk Drive).

The text data 10 is data of a character string with plural words.

The synonym dictionary table 150a is a table that associates a word with corresponding synonyms. FIG. 3 is a diagram illustrating an example of a data structure of the synonym dictionary table. As illustrated in FIG. 3, the synonym dictionary table 150a associates synonym identification number with word (synonym).

The synonym identification number is the number that identifies the synonym. Words with the same synonym identification number are synonyms. For example, words with the synonym identification number "1.1", which are "birth, genesis, nativity, childbirth, birthing, and nascency", are synonyms.

The word vector table 150b is a table that associates word with vector of the word. FIG. 4 is a diagram illustrating an example of a data structure of the word vector table. As illustrated in FIG. 4, the word vector table 150b associates word with vector. For example, the vector of the word "birth" is identified as "$V_{birth}$".

The English/language dictionary table 150c is a table that holds therein information of a definition that defines each semantics of a word. FIG. 5 is a diagram illustrating an example of a data structure of the English/language dictionary table. As illustrated in FIG. 5, the English/language dictionary table 150c associates word with semantics, definition number, definition, and example sentence. As illustrated in FIG. 5, even one word is still associated with plural semantics. The definition number is the number to be assigned to the definition.

The definition is a sentence defining the semantics. For example, the semantics "KNOWLEDGE" of the word "deep" corresponds to the definition "showing great knowledge or understanding". The example sentence illustrates an example of the sentence using the word with a corresponding semantics.

The synonym table 150d is a table that holds therein information of a group vector of respective synonyms described at Step S11 in FIG. 1. FIG. 6 is a diagram illustrating an example of a data structure of the synonym table. As illustrated in FIG. 6, the synonym table 150d associates synonym identification number with word (synonym), vector, and group vector.

The synonym identification number is the number that identifies the synonym. Words with the same synonym identification number are synonyms. The vector is associated with each word (synonym). The vector of each word is defined in the word vector table 150b described in FIG. 4. The group vector is a vector into which the vectors of the words (synonyms) with the same synonym identification number are consolidated.

The multisense word table 150e is a table that holds therein information of each semantics of a multisense word. FIG. 7 is a diagram illustrating an example of a data structure of the multisense word table. As illustrated in FIG. 7, the multisense word table 150e associates multisense word with number of semantics, semantics, semantic identification number, group vector, definition number, semantic code, and semantic vector.

The multisense word indicates a word with plural semantics. The number of semantics indicates how many semantics the multisense word has. The semantics indicates an individual semantics included in the multisense word. The synonym identification number is the number that uniquely identifies the synonym to which the word as the semantics belongs. The group vector is a vector into which the vectors of the synonyms corresponding to the synonym identification number are consolidated. The definition number is equivalent to the definition number illustrated in FIG. 5. The semantic code is a code assigned to the semantics. The semantic vector is a vector assigned to the corresponding semantics of the word.

The semantic determination table 150f is a table used to determine the semantics of a word included in a sentence. FIG. 8 is a diagram illustrating an example of a data structure of the semantic determination table. As illustrated in FIG. 8, the semantic determination table 150f associates multisense word with semantic ID, semantics, and co-occurring word.

The multisense word indicates a word with plural semantics. The semantic ID is the number that uniquely identifies the semantics included in a multisense word. The semantics indicates an individual semantics included in the multisense word. The co-occurring word indicates a word that occurs with the multisense word with a certain semantics. The co-occurring word is associated with a co-occurrence rate. For example, when the multisense word "deep" appears with the semantics "knowledge" in a sentence, the word "understanding" may occur with the multisense word "deep" either before or after "deep" with a "41%" possibility.

Referring back to FIG. 2, the control unit 160 includes a word-vector computation unit 160a, a group-vector computation unit 160b, a semantic-vector computation unit 160c, and a vector determination unit 160d. The control unit 160 can be implemented by a CPU (Central Processing Unit), an MPU (Micro Processing Unit), or the like. Further, the control unit 160 can be also implemented by a hard wired logic such as an ASIC (Application Specific Integrated Circuit) or an FPGA (Field Programmable Gate Array).

The word-vector computation unit 160a is a processing unit that computes the vector of a word included in the text data 10 on the basis of skip-gram. The word-vector computation unit 160a associates a word with a vector of the word, and stores the word and the vector in the word vector table 150b.

FIG. 9 is an explanatory diagram of an example of the process in the word-vector computation unit. In FIG. 9, the word-vector computation unit inputs a sentence "I want to eat an apple everyday" included in the text data 10, and then computes a vector of the word "eat" included in this sentence.

The word-vector computation unit 160a learns the probability of the given word "eat" and the co-occurring word through the network. For example, the network includes an input layer 5a, a hidden layer 5b, and an output layer 5c. When a word is input to the input layer 5a, the co-occurrence probability of a co-occurring word that occurs with the input word is output from the output layer 5c in accordance with a feature amount set in the hidden layer 5b.

The word-vector computation unit 160a repeatedly learns a plurality of sentences such that the feature amount of the hidden layer 5b becomes an optimum value on the basis of a relation between the word "eat" and the co-occurring word that occurs with the word "eat". For example, the word-vector computation unit 160a inputs the word "eat" to the input layer 5a, and inputs the co-occurring word "apple" that occurs with the word "eat" in the sentence "I want to eat an apple everyday" to the output layer 5c to adjust the feature amount of the hidden layer 5b. The word-vector computation unit 160a performs the same process repeatedly on other sentences (Step S20).

The word-vector computation unit 160a identifies the adjusted feature amount of the hidden layer 5b, which results from repeatedly performing Step S20, as a vector of the word "eat" (Step S21). At Step S21 in FIG. 9, an example is illustrated in which when the feature amount of the hidden layer 5b is adjusted and consequently the word "eat" is input to the input layer 5a, then the co-occurring words (co-occurrence probability) "apple (0.4)", "orange (0.4)", . . . , and "network (0.01)" are output from the output layer 5c.

The word-vector computation unit 160a computes vectors of other words by repeatedly performing the above process on the other words.

The group-vector computation unit 160b is a processing unit that selects a word from the word vector table 150b, and computes a group vector on the basis of a vector of the selected word and a vector of a synonym for the selected word. An example of the process in the group-vector computation unit 160b is described below.

The group-vector computation unit 160b compares the selected word with the synonym dictionary table 150a, and determines a synonym identification number corresponding to the selected word. The group-vector computation unit 160b obtains a synonym corresponding to the determined synonym identification number from the synonym dictionary table 150a. The group-vector computation unit 160b obtains a vector of the obtained synonym from the word vector table 150b. In the following descriptions, the selected word and a synonym for the selected word are appropriately and collectively referred to as "synonym". The group-vector computation unit 160b registers the synonym identification number, the synonym, and the vector, which are associated with each other, in the synonym table 150d.

Figure 10:
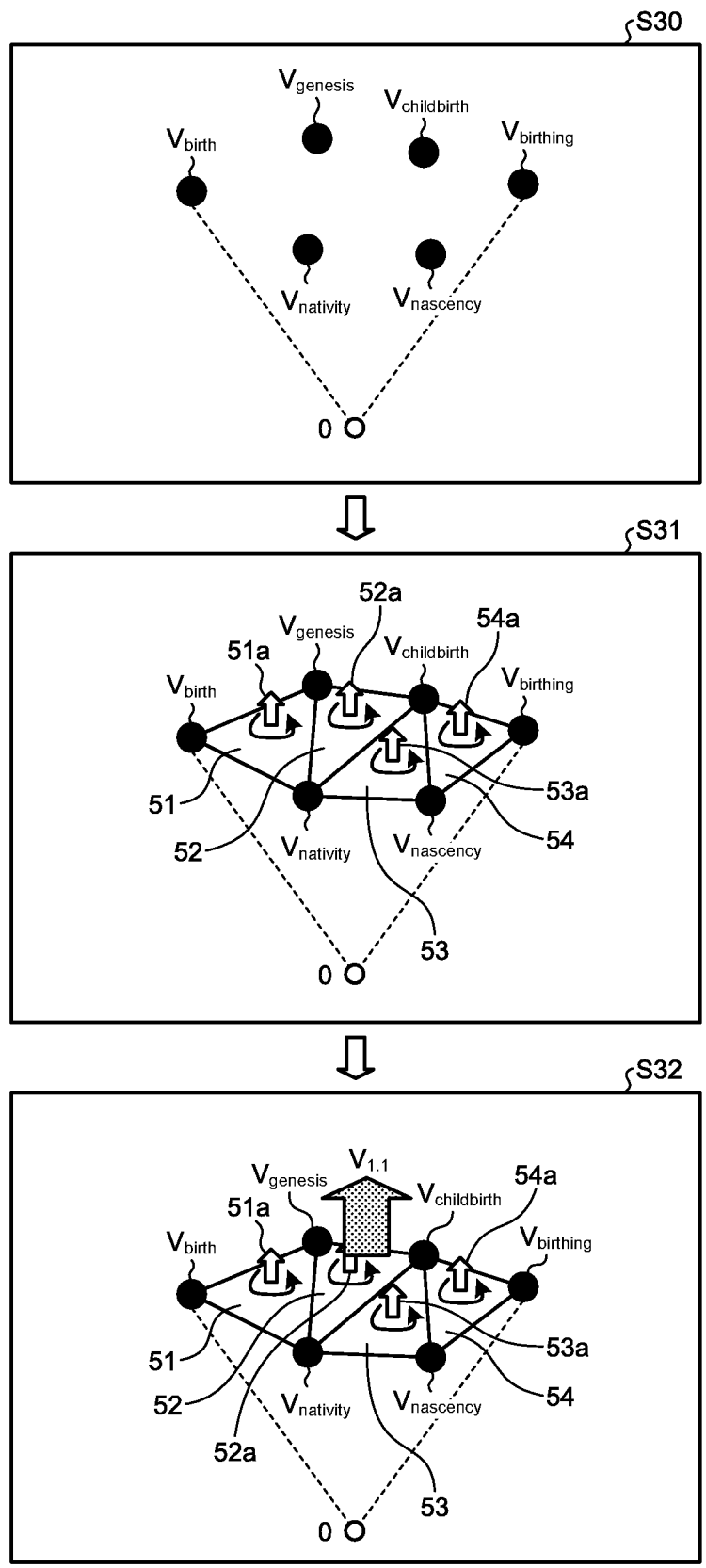
FIG. 10 is an explanatory diagram of a process in a group-vector computation unit.

On the basis of the vectors of the synonyms corresponding to the same synonym identification number, the group-vector computation unit 160b computes a group vector with this synonym identification number. FIG. 10 is a an explanatory diagram of a process in the group-vector computation unit. FIG. 10 illustrates a case where the synonyms "birth, nativity, nascency, birthing, childbirth, and genesis" are set, and then the group-vector computation unit 160b computes a group vector of these synonyms.

Step S30 in FIG. 10 is described. The group-vector computation unit 160b obtains vectors of the synonyms "birth, nativity, nascency, birthing, childbirth, and genesis", that is, "$V_{birth}$, $V_{nativity}$, $V_{nascency}$, $V_{birthing}$, $V_{childbirth}$, and $V_{genesis}$" from the word vector table 150b.

Step S31 in FIG. 10 is described. The group-vector computation unit 160b generates meshes 51 to 54 on the basis of the vectors "$V_{birth}$, $V_{nativity}$, $V_{nascency}$, $V_{birthing}$, $V_{childbirth}$, and $V_{genesis}$". The mesh 51 is constituted of the vectors "$V_{birth}$, $V_{nativity}$, and $V_{genesis}$". The mesh 52 is constituted of the vectors "$V_{nativity}$, $V_{childbirth}$, and $V_{genesis}$". The mesh 53 is constituted of the vectors "$V_{nativity}$, $V_{nascency}$, and $V_{childbirth}$". The mesh 54 is constituted of the vectors "$V_{nascency}$, $V_{birthing}$, and $V_{childbirth}$".

Figure 11:
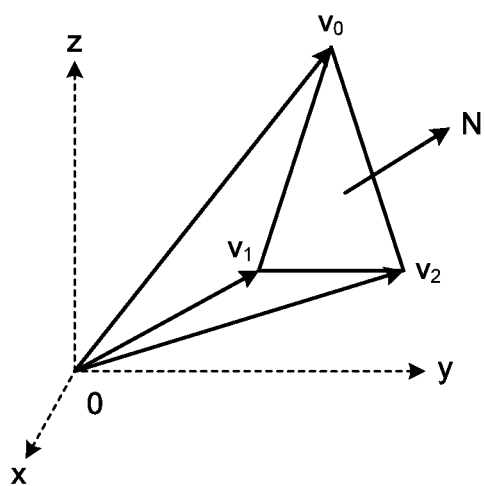
FIG. 11 is a diagram illustrating a relation between vectors and a normal vector.

The group-vector computation unit 160b calculates normal vectors 51a to 54a of the meshes 51 to 54, respectively. For example, the group-vector computation unit 160b calculates a normal vector N of a mesh constituted of vectors $v_0$, $v_1$, and $v_2$ on the basis of the equation (1) below. FIG. 11 is a diagram illustrating a relation between vectors and a normal vector.

$$\text{Normal vector } N=(v_1-v_0)\times(v_2-v_0)/|(v_1-v_0)\times(v_2-v_0)| \qquad (1)$$

Step S32 in FIG. 10 is described. The group-vector computation unit 160b combines the normal vectors 51a to 54a to compute a group vector $V_{1.1}$. It is allowable that the group-vector computation unit 160b normalizes a vector obtained by combining the normal vectors 51a to 54a, and thereby generates the group vector $V_{1.1}$. The group-vector computation unit 160b registers the computed group vector, associated with the corresponding synonym identification number, in the synonym table 150d. For example, the group-vector computation unit 160b registers the group vector $V_{1.1}$, associated with the synonym identification number "1.1", in the synonym table 150d.

The group-vector computation unit 160b also performs the processes at Steps S30 to S32 described above on other words to compute a group vector corresponding to the words, and registers the computed group vector in the synonym table 150d. The group-vector computation unit 160b compares the synonym table 150d with the multisense word table 150e, and registers the group vector, associated with the synonym identification number, in the multisense word table 150e.

In the multisense word table 150e, the multisense word, the number of semantics, the semantics, the synonym identification number, the definition number, and the semantic code described in FIG. 7 are set in advance. Information of the group vector in the multisense word table 150e is registered in the group-vector computation unit 160b as described above. Information of the semantic vector in the multisense word table 150e is registered in the semantic-vector computation unit 160c described later.

The semantic-vector computation unit 160c is a processing unit that computes a semantic vector corresponding to the semantics of a word. An example of a process in the semantic-vector computation unit 160c is described below. The semantic-vector computation unit 160c refers to the multisense word table 150e, and selects a set of word and semantics as a target for semantic vector computation. A case where the semantic vector of the semantics "KNOWLEDGE" of the word "deep" is computed is described as an example.

The semantic-vector computation unit 160c refers to the multisense word table 150e, and obtains a group vector $V_{deep\_KNOWLEDGE}$ corresponding to the multisense word (word) "deep" and the semantics "KNOWLEDGE".

The semantic-vector computation unit 160c refers to the English/language dictionary table 150c, and extracts a feature word from the definition corresponding to the word "deep" and the semantics "KNOWLEDGE". For example, the semantic-vector computation unit 160c extracts feature words "great, knowledge, and understanding" from the definition of the semantics "KNOWLEDGE", that is, "showing great knowledge or understanding".

The semantic-vector computation unit 160c excludes some of the words included in the definition, which are identical to the synonyms as the source of generation of the group vector, from the feature words. The semantic-vector computation unit 160c excludes an article and a conjunction from the words included in the definition. The semantic-vector computation unit 160c excludes formal words set in advance, such as "showing", from the words included in the definition. For example, the semantic-vector computation unit 160c extracts a word, not to be excluded from the words included in the definition, as a feature word.

The semantic-vector computation unit 160c compares the feature words "great, knowledge, and understanding" with the word vector table 150b, and obtains vectors of the feature words. The semantic-vector computation unit 160c calculates normal vectors on the basis of the vectors of the feature words, and combines the calculated normal vectors with the group vector $V_{920.17}$ of the word "deep" to compute the semantic vector $V_{deep\_KNOWLEDGE}$. This process is equivalent to the process illustrated at Step S12 in FIG. 1.

The semantic-vector computation unit 160c registers the semantic vector "$V_{deep\_KNOWLEDGE}$" corresponding to the semantics "KNOWLEDGE" of the multisense word "deep" in the multisense word table 150e. The semantic-vector computation unit 160c also repeatedly performs the corresponding processes described above on the other semantics of the multisense word "deep" and on each semantics of other multisense words in order to compute semantic vectors, and registers the computed semantic vectors in the multisense word table 150e.

When the vector determination unit 160d obtains a character string as a target for vector computation, the vector determination unit 160d determines a vector of each word included in the obtained character string. For example, the vector determination unit 160d receives a character string such as "You should try to gain a deep understanding of the problem.", and determines a vector of each word included in this character string. A case where the semantic vector of the word "deep" is determined is now described as an example.

The vector determination unit 160d compares the word "deep" with the semantic determination table 150f, and determines the semantics of the word "deep" in the character string "You should try to gain a deep understanding of the problem.". For example, because the co-occurring word "understanding" appears immediately after the word "deep", the vector determination unit 160d determines the semantics of the word "deep" as "KNOWLEDGE".

The vector determination unit 160d obtains a semantic vector corresponding to the semantics "KNOWLEDGE" of the word "deep" from the multisense word table 150e, and assigns the obtained semantic vector to the word "deep".

Figure 12:
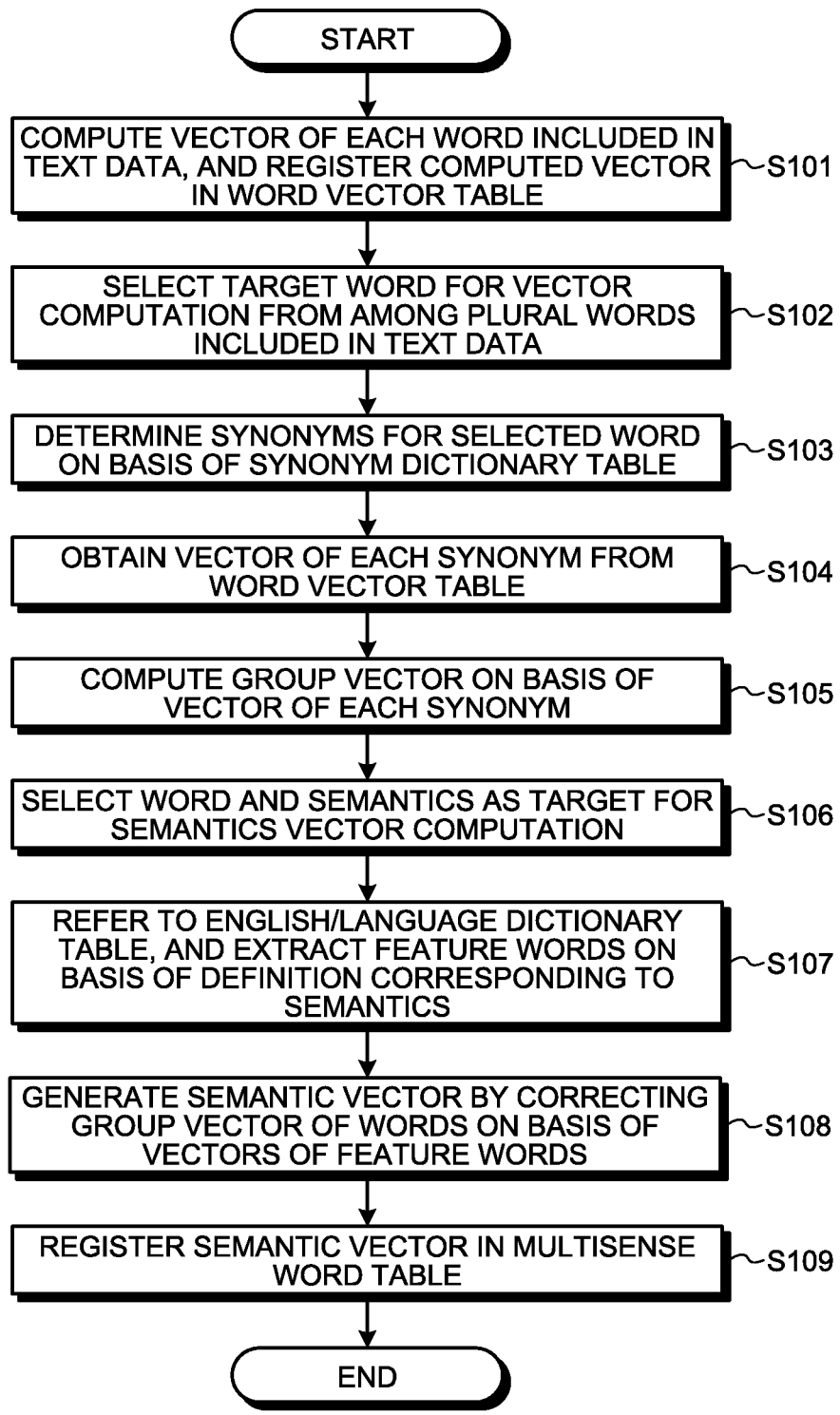
FIG. 12 is a flowchart illustrating a process of calculating a semantic vector.

Next, an example of a processing procedure of the semantic vector generation device 100 according to the present embodiment is described. FIG. 12 is a flowchart illustrating a process of calculating a semantic vector. As illustrated in FIG. 12, the word-vector computation unit 160a in the semantic vector generation device 100 computes a vector of each word included in the text data 10, and registers the computed vector in the word vector table 150b (Step S101).

The group-vector computation unit 160b in the semantic vector generation device 100 selects a target word for vector computation from among a plurality of words included in the text data 10 (Step S102). The group-vector computation unit 160b determines synonyms for the selected word on the basis of the synonym dictionary table 150a (Step S103).

The group-vector computation unit 160b obtains vectors of the synonyms from the word vector table 150b (Step S104). The group-vector computation unit 160b computes a group vector on the basis of the vectors of the synonyms (Step S105).

The semantic-vector computation unit 160c in the semantic vector generation device 100 selects a word and a semantics as a target for semantic vector computation (Step S106). The semantic-vector computation unit 160c refers to the English/language dictionary table 150c, and extracts feature words from the definition corresponding to the semantics (Step S107).

The semantic-vector computation unit 160c corrects the group vector of the word on the basis of the vectors of the feature words thereby generating a semantic vector (Step S108). The semantic-vector computation unit 160c registers the semantic vector in the multisense word table 150e (Step S109).

Figure 13:
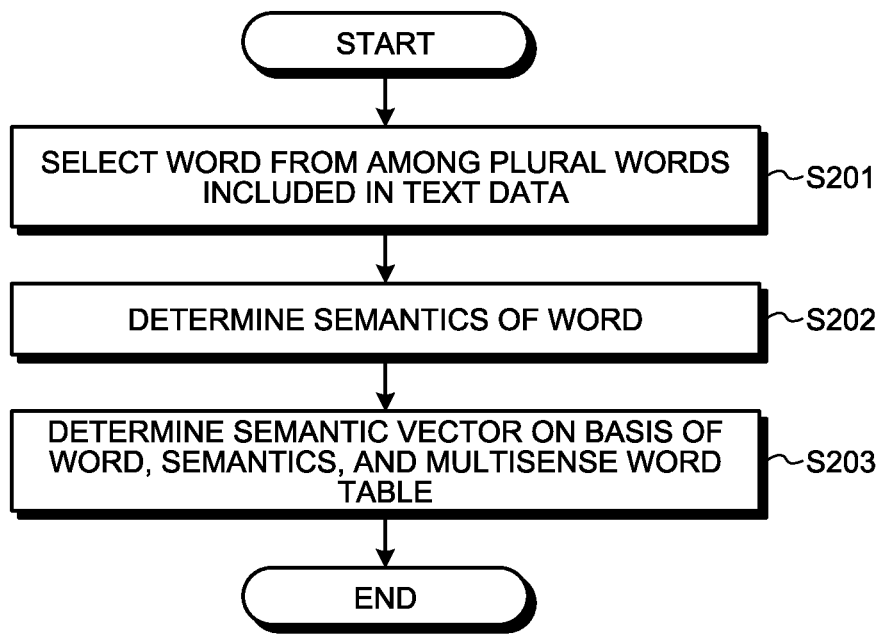
FIG. 13 is a flowchart illustrating a process of determining a semantic vector corresponding to a word.

FIG. 13 is a flowchart illustrating a process of determining a semantic vector corresponding to a word. As illustrated in FIG. 13, the vector determination unit 160d in the semantic vector generation device 100 selects a word from among a plurality of words included in the text data 10 (Step S201).

The vector determination unit 160d determines the semantics of the word on the basis of the semantic determination table 150f (Step S202). The vector determination unit 160d determines a semantic vector on the basis of the word, the semantics, and the multisense word table 150e (Step S203).

Next, effects of the semantic vector generation device 100 according to the present embodiment are described. The semantic vector generation device 100 generates a semantic vector of a target word by correcting a group vector using vectors of feature words included in a definition of a target semantics, the group vector being obtained by combing the vector of the target word with the vectors of the synonyms for the target word. Accordingly, the semantic vector generation device 100 can generate a semantic vector appropriate to each of the semantics of an identical word. Therefore, the semantic vector generation device 100 can improve relevance of the semantic vector to the semantics.

The semantic vector generation device 100 calculates a group vector by combining normal vectors on the basis of the vector of a target word and the vectors of synonyms for the target word, and thus can more accurately calculate a representative vector of the target word and the synonyms.

The semantic vector generation device 100 generates a semantic vector of a target word on the basis of vectors of feature words included in an explanation corresponding to the semantics of the target word, and on the basis of the group vector, and thus can more accurately calculate the semantic vector.

When the semantic vector generation device 100 receives a target word for vector identification, the semantic vector generation device 100 determines the semantics of the target word, and then identifies a semantic vector of the target word on the basis of the multisense word table 150e. Accordingly, the semantic vector generation device 100 can identify the vector in accordance with the semantics of the word.

Figure 14:
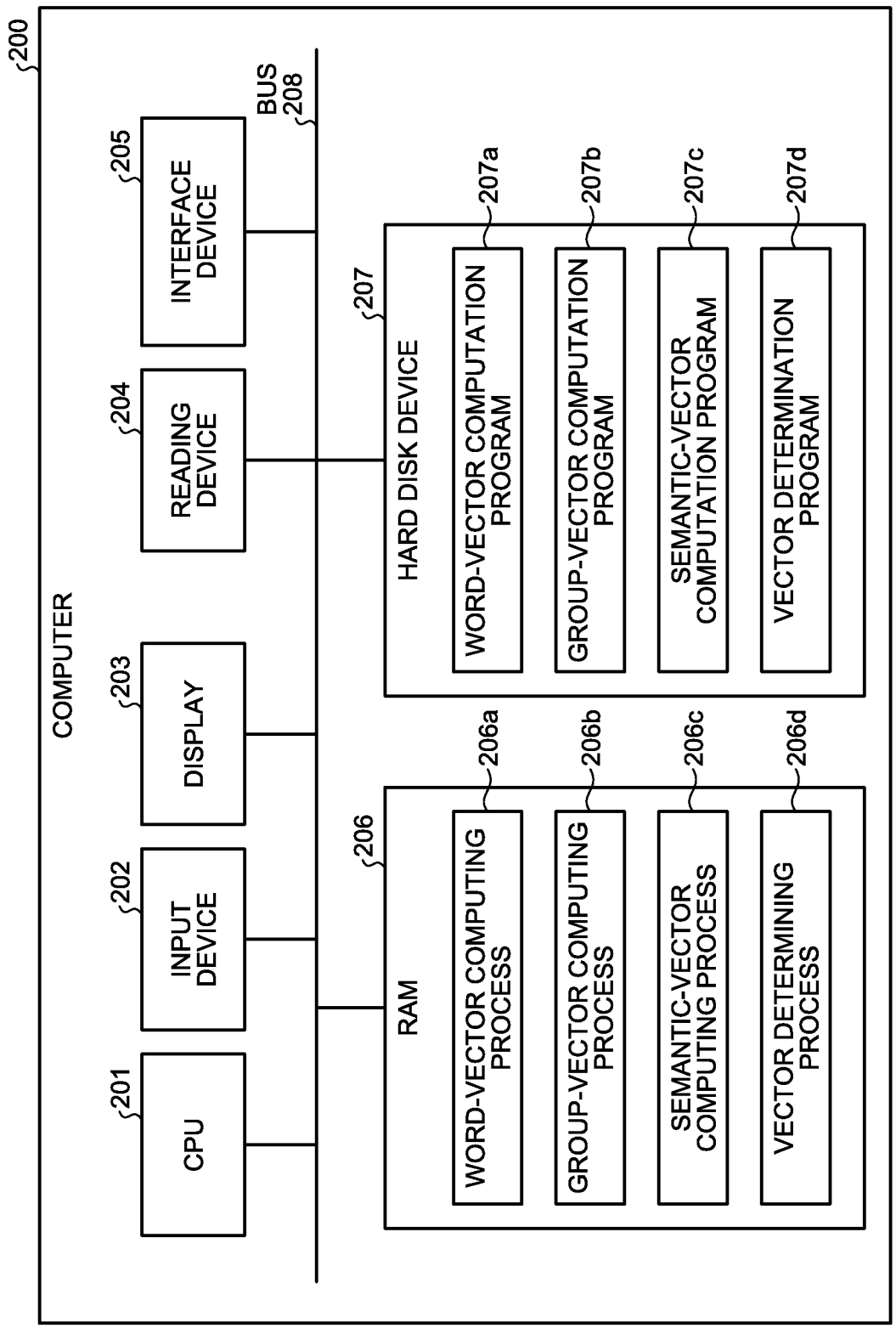
FIG. 14 is a diagram illustrating an example of a hardware configuration of a computer that implements functions that are the same as those of the semantic vector generation device.

Descriptions are now given of an example of a hardware configuration of a computer that implements functions that are the same as those of the semantic vector generation device 100 described in the present embodiment. FIG. 14 is a diagram illustrating an example of the hardware configuration of a computer that implements functions that are the same as those of the semantic vector generation device.

As illustrated in FIG. 14, a computer 200 includes a CPU 201 that performs various types of computation processing, an input device 202 that receives an input of data from users, and a display 203. The computer 200 further includes a reading device 204 that reads a program or the like from a storage medium, and an interface device 205 that transmits and receives data to and from other computers through a wireless network. The computer 200 further includes a RAM 206 that temporarily stores therein various types of information, and a hard disk device 207. These devices 201 to 207 are connected to a bus 208.

The hard disk device 207 includes a word-vector computation program 207a, a group-vector computation program 207b, a semantic-vector computation program 207c, and a vector determination program 207d. The CPU 201 reads the word-vector computation program 207a, the group-vector computation program 207b, the semantic-vector computation program 207c, and the vector determination program 207d, and then loads these programs into the RAM 206.

The word-vector computation program 207a functions as a word-vector computing process 206a. The group-vector computation program 207b functions as a group-vector computing process 206b. The semantic-vector computation program 207c functions as a semantic-vector computing process 206c. The vector determination program 207d functions as a vector determining process 206d.

The word-vector computing process 206a is equivalent to the process in the word-vector computation unit 160a. The group-vector computing process 206b is equivalent to the process in the group-vector computation unit 160b. The semantic-vector computing process 206c is equivalent to the process in the semantic-vector computation unit 160c. The vector determining process 206d is equivalent to the process in the vector determination unit 160d.

For example, these programs 207a to 207d are stored in a "portable physical medium" such as a flexible disk (FD), a CD-ROM, a DVD disk, a magneto optical disk, and an IC card to be inserted into the computer 200. It is possible to configure that the computer 200 subsequently reads out and implement the programs 207a to 207d.

In a multisense word with plural semantics, it is possible to improve relevance of a semantic vector to corresponding semantics.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention have been described in detail, it should be understood that the various changes, substitutions, and alterations could be made hereto without departing from the spirit and scope of the invention.

What is claimed is:

1. A non-transitory computer readable storage medium having stored therein a program that causes a computer to execute a process comprising:
   obtaining vectors of a plurality of words included in text data that is an explanation of a semantics of a first word;
   referring to a storage unit that stores therein a plurality of words satisfying a semantic similarity criterion in association with a group of the words;
   extracting a first word included in the text data and included in any group;
   calculating a normal vector of a vector of the first word and vectors of a plurality of second words in accordance with the any group on a basis of a vector of the word extracted among the obtained vectors of the plurality of words, the second word being included in the same group as the group including the first word, the plurality of second words being a synonym of the first word;
   referring to the storage unit that stores therein an explanation of each semantics of a word including plural semantics in association with the word;
   identifying vectors of a plurality of third words included in the first explanation of semantics of the first word including plural semantics and extracted among the obtained vectors of the words; and
   second generating a vector in accordance with the first semantics of the first word on a basis of the calculated normal vector and the vectors of the plurality of third words.

2. The non-transitory computer readable storage medium according to claim 1, wherein the second generates a vector of the group including the first word and the plurality of the second words by calculating a normal vector on a basis of a vector of the first word and vectors of the plurality of the second words that are synonyms for the first word.

3. The non-transitory computer readable storage medium according to claim 1, the process further comprising storing a word, a semantics of the word, and a vector in accordance with the semantics, which are associated with each other, in the storage unit, determining a semantics of a target word for vector identification when the target word is received, and identifying a vector of the target word on a basis of a determination result and the storage unit.

4. A semantic vector generation method comprising:
   obtaining vectors of a plurality of words included in text data that is an explanation of a semantics of a first word, using a processor;
   referring to a storage unit that stores therein a plurality of words satisfying a semantic similarity criterion in association with a group of the words, using the processor;
   extracting a first word included in the text data and included in any group, using the processor;
   calculating a normal vector of a vector of the first word and vectors of a plurality of second words in accordance with the any group on a basis of a vector of the word extracted among the obtained vectors of the plurality of words, the second word being included in the same group as the group including the first word, the plurality of second words being a synonym of the first word, using the processor;
   referring to the storage unit that stores therein an explanation of each semantics of a word including plural semantics in association with the word, using the processor;
   identifying vectors of a word plurality of third words included in the first explanation of semantics of the first word including plural semantics and extracted among the obtained vectors of the words, using the processor; and
   second generating a vector in accordance with the first semantics of the first word on a basis of the calculated normal vector and the vectors of the plurality of third words, using the processor.

5. The semantic vector generation method according to claim 4, wherein the second generates a vector of the group including the first word and the plurality of the second words by calculating a normal vector on a basis of a vector of the first word and vectors of the plurality of the second words that are synonyms for the first word.

6. The semantic vector generation method according to claim 4, the semantic vector generation method further comprising storing a word, a semantics of the word, and a vector in accordance with the semantics, which are associated with each other, in the storage unit, determining a semantics of a target word for vector identification when the target word is received, and identifying a vector of the target word on a basis of a determination result and the storage unit.

7. A semantic vector generation device comprising:
   a memory; and
   a processor coupled to the memory and configured to:
   obtain vectors of a plurality of words included in text data that is an explanation of a semantics of a first word;
   refer to the memory that stores therein a plurality of words satisfying a semantic similarity criterion in association with a group of the words, extracts a first word included in the text data and included in any group;
   calculate a normal vector of a vector of the first word and vectors of a plurality of second words in accordance with the any group on a basis of a vector of the word extracted among the obtained vectors of the plurality of words, the second word being included in the same group as the group including the first word, the plurality of second words being a synonym of the first word; and
   refer to the memory that stores therein an explanation of each semantics of a word including plural semantics in association with the word;
   identify vectors of a plurality of third words included in the first explanation of semantics of the first word including plural semantics and extracted among the obtained vectors of the words; and
   generate a vector in accordance with the first semantics of the first word on a basis of the calculated normal vector and the vectors of the plurality of third words.

8. The semantic vector generation device according to claim 7, further configured to generate a vector of the group including the first word and the plurality of the second words by calculating a normal vector on a basis of a vector of the first word and vectors of the plurality of the second words that are synonyms for the first word.

9. The semantic vector generation device according to claim 7, further configured to store a word, a semantics of the word, and a vector in accordance with the semantics, which are associated with each other, in the memory, determine a semantics of a target word for vector identification when the target word is received, and identify a vector of the target word on a basis of a determination result and the memory.

\* \* \* \* \*